(12) United States Patent
Wittek

(10) Patent No.: US 9,784,305 B2
(45) Date of Patent: Oct. 10, 2017

(54) VARIABLE LENGTH CONNECTING ROD OF AN INTERNAL COMBUSTION ENGINE

(71) Applicant: FEV GmbH, Aachen (DE)

(72) Inventor: Karsten Wittek, Heilbronn (DE)

(73) Assignee: FEV Europe GmbH, Aachen (DE)

( * ) Notice: Subject to any disclaimer, the term of this patent is extended or adjusted under 35 U.S.C. 154(b) by 0 days.

(21) Appl. No.: 15/102,126

(22) PCT Filed: Dec. 8, 2014

(86) PCT No.: PCT/EP2014/076914
§ 371 (c)(1),
(2) Date: Jun. 6, 2016

(87) PCT Pub. No.: WO2015/082722
PCT Pub. Date: Jun. 11, 2015

(65) Prior Publication Data
US 2016/0305471 A1    Oct. 20, 2016

(30) Foreign Application Priority Data

Dec. 6, 2013 (DE) ........................ 10 2013 225 063

(51) Int. Cl.
*F02B 75/04* (2006.01)
*F02B 75/26* (2006.01)
*F16C 7/06* (2006.01)
*F15B 15/14* (2006.01)
*F16H 19/04* (2006.01)

(52) U.S. Cl.
CPC .............. *F16C 7/06* (2013.01); *F02B 75/045* (2013.01); *F15B 15/14* (2013.01); *F16H 19/04* (2013.01)

(58) Field of Classification Search
CPC ... F02F 7/0053; F02F 3/00; F16C 7/06; F16C 23/10; F02B 75/045; F02B 75/32; F16H 19/04; F15B 19/04; F15B 15/1457
USPC ........................ 123/48 B, 78 E, 48 R, 78 BA
See application file for complete search history.

(56) References Cited

U.S. PATENT DOCUMENTS 2,989,954 A    6/1961    Hulbert

FOREIGN PATENT DOCUMENTS

| DE | 3148193 A1 | 6/1983 |
| EP | 1424486 A1 | 6/2004 |
| GB | 473887 A | 10/1937 |

OTHER PUBLICATIONS

International Search Report dated Aug. 7, 2015, International Application No. PCT/EP2014/076914, filed Dec. 8, 2014.

*Primary Examiner* — Syed O Hasan
(74) *Attorney, Agent, or Firm* — Dinsmore & Shohl LLP

(57) ABSTRACT

A connecting rod for an internal combustion engine having an adjustable length between a first connecting rod eye and a second connecting rod eye. An eccentric member having a bearing bore which is positioned eccentrically to an outer diameter is rotated to adjust the length. The eccentric member is rotated by a rack and pinion drive and a double acting hydraulic cylinder.

12 Claims, 9 Drawing Sheets

VARIABLE LENGTH CONNECTING ROD OF AN INTERNAL COMBUSTION ENGINE

CROSS-REFERENCE TO RELATED APPLICATIONS

This application is the U.S. national stage of PCT/EP2014/076914 filed Dec. 8, 2014, which claims priority of German Patent Application 10 2013 225 063.0 filed Dec. 6, 2013.

FIELD OF THE INVENTION

The invention relates to a connecting rod for a reciprocating piston internal combustion engine (also called an internal combustion engine (ICE) in the following text). In the case of said connecting rod, the gudgeon pin is mounted eccentrically in the small connecting rod eye. A variable compression ratio is also abbreviated in the following text as VCR; accordingly, the connecting rod according to the invention is also called a VCR connecting rod. Otherwise, the terms "conrod" and "connecting rod" are used synonymously in conjunction with the invention.

The main motivation for a variable compression ratio is a reduction in the fuel consumption. There are various alternatives for realizing a VRC. Important aspects during the selection of a suitable alternative are the required structural amendments to a conventional internal combustion engine and the costs.

BACKGROUND OF THE INVENTION

VCR conrods for realizing a variable compression in internal combustion engines belong to the prior art. DE-A-10 2005 055 199 describes a VCR conrod, in which the effective conrod length is brought about by way of rotation of an eccentric which is mounted in the small connecting rod eye. Here, the eccentric rotation is firstly brought about by the forces which act on the gudgeon pin during the operation of the internal combustion engine and secondly hydraulic forces on a supporting mechanism.

Said supporting mechanism limits the rotating speed of the eccentric and prevents undesired rotating back of the eccentric. The supporting mechanism which is known from DE-A-10 2005 055 199 consists of a pair of slider crank mechanisms on both sides of the eccentric, the pistons of which are supported in each case on fluid-filled supporting chambers. By way of a corresponding hydraulic connection of said supporting chambers, the desired reverse rotation lock and the desired braking action are realized.

One disadvantage of said VCR conrod is the increase in the (oscillating) mass in comparison with a conventional conrod. Moreover, the supporting mechanism, in particular the lever which is connected to the eccentric, requires a corresponding clearance in the interior space of the piston.

An adjustment toward high compression requires upwardly directed forces on the gudgeon pin, as occur during the phase of the gas exchange. That part of said gudgeon pin force which is caused by the centrifugal force increases as the square of the rotational speed. Conversely, the result of this is that the force which is available is reduced by the square of the rotational speed. As a consequence, the adjusting time increases greatly at low rotational speeds, as a result of which the thermodynamic potential of the variable compression can be used only incompletely in transient operation.

Moreover, DE-A-10 2005 055 199 discloses a reciprocating piston internal combustion engine having an adjustable variable compression ratio in a reciprocating piston by means of an actuating unit. The actuating unit is actuated by way of an adjusting mechanism, the adjusting mechanism having a rack and pinion drive. Here, the actuating unit and the adjusting mechanism are arranged outside a conrod of the reciprocating piston internal combustion engine. An arrangement of this type is very expensive and therefore requires a large amount of installation space in the internal region of the piston.

Furthermore, EP-B-1 496 219 describes an internal combustion engine with a variable compression ratio and DE-A-10 2012 014 917 describes a pressure pulse actuation means for a device for adjusting a variable compression ratio.

SUMMARY OF THE INVENTION

The object on which the invention is based consists in providing a VCR conrod which avoids the abovementioned disadvantages completely or at least partially.

According to the invention, this object is achieved in a connecting rod for an internal combustion engine comprising a large connecting rod eye, a small connecting rod eye, an eccentric with a bearing bore which is arranged eccentrically with respect to its external diameter for a gudgeon pin being configured in the small connecting rod eye, and means for supporting the eccentric in order to prevent a rotational movement of the eccentric relative to the connecting rod being provided, by virtue of the fact that the means for supporting comprise a rack and pinion drive and a double acting hydraulic cylinder which is coupled to the rack and pinion drive, the rack and pinion drive and the hydraulic cylinder being an integral part of the connecting rod.

The VCR conrod according to the invention has the following advantages over the prior art:

A merely low increase in the conrod mass, in particular in the oscillating mass; a lower installation space requirement, in particular in the internal region of the piston; lower mechanical loads of the supporting mechanisms; lower production costs and virtually constant adjusting times, even at low engine rotational speeds.

In one advantageous refinement of the invention, the eccentric has a toothing system which is concentric with respect to its external diameter and meshes directly or indirectly via an intermediate gear with a rack of the rack and pinion drive.

As a result, it is possible to integrate the actuating travel of the rack into the connecting rod in an optimum manner with a minimum installation space requirement and to adapt it to various applications.

By way of the intermediate gear, the rack can be displaced further in the direction of the large connecting rod eye, with the result that, in the case of the conrod according to the invention, the rack protrudes only a little beyond the conrod main body even in its extended end position.

In order that the engagement between the rack and the gearwheel or the external toothing system of the eccentric takes place precisely and without play, a guide face which interacts with a complementary groove in the connecting rod is configured on the rack.

As a result, a linear guide of the rack is configured in the connecting rod in a simple way, which linear guide is resilient and durable.

It is provided in one refinement according to the invention that a cylinder bore of the hydraulic cylinder is arranged in the connecting rod and is particularly preferably configured in the form of a precisely machined bore in the connecting rod. As a result, the material costs are saved and the installation space requirement for the double acting cylinder is minimized.

The cylinder has a piston rod with a piston, the piston rod being coupled at one end to the rack, with the result that, via the locking action of the piston in a desired position, the eccentric is therefore also at the same time locked or supported in the upper connecting rod eye. The actuating forces for rotating the eccentric do not have to be applied by the cylinder. Rather, it is the case that the mass forces which occur during operation of the internal combustion engine provide the energy which is required for rotating the eccentric. The cylinder serves via the rack and pinion drive merely to support the eccentric in such a way that it maintains the position which is provided by the engine controller.

The double acting cylinder is divided by way of the piston into an upper supporting chamber and a lower supporting chamber, the upper supporting chamber being sealed by way of a piston bushing, and the piston rod being guided sealingly through the piston bushing.

Here, in principle, every design known from the prior art of a double acting cylinder with a single or double piston rod can be used or can be adapted correspondingly to the application.

Furthermore, in one refinement according to the invention of the connecting rod, a first duct for supplying the upper supporting chamber with a hydraulic fluid and a second duct for supplying the lower supporting chamber are configured in said connecting rod.

In accordance with the requirements and other boundary conditions during the manufacture and construction of the connecting rod, said ducts can be configured as bores in the connecting rod. However, it is also possible in the case of screwed conrods that the fastening bore of the connecting rod is configured as a stepped bore and has a greater diameter at least in regions than the shank of the connecting rod screw. An annular duct section is then produced between the shank of the connecting rod screw and the bore.

Furthermore, it is of course also possible to configure said ducts in the form of grooves which are milled into the connecting rod.

In a further advantageous refinement of the invention, a supply groove which serves to supply the two ducts with lubricating oil is configured in the lower half of the large connecting rod eye. It is to be noted in this regard that the plain bearing of the large connecting rod eye is continuously supplied with pressurized oil via the oil pump of the internal combustion engine. According to the invention, part of said oil quantity is always branched off and is guided into one of the two supporting chambers of the double acting cylinder when the eccentric is to perform a rotational movement. Here, the oil flows via the supply groove into a directional valve and from there into the first duct or the second duct. Depending on which of the two ducts is supplied via the supply groove and the directional valve with lubricating oil from the oil circuit of the internal combustion engine, the lower supporting chamber or the upper supporting chamber is enlarged and, as a consequence thereof, the piston moves in the direction of the small connecting rod eye or in the direction of the large connecting rod eye.

In other words: by way of the actuation of the directional valve between the supply groove and the ducts, the piston of the cylinder can move in one or the other direction and makes the rotational movement of the eccentric possible as a result.

If the eccentric is to be locked in its position, the directional valve is switched in such a way that, for example, the oil in the lower supporting chamber cannot flow out of the latter. As a consequence thereof, the oil in the lower supporting chamber serves to a certain extent as a stop for the piston which in this way supports the eccentric in the small connecting rod eye in a first position and prevents it from rotating.

If the eccentric is to assume the opposite second position, the upper supporting space is filled with oil and, when the directional valve is closed, assumes the function of a stop for the piston, with the result that the eccentric is also locked in said position.

It goes without saying that there are various designs of directional valve which are suitable in principle for the use according to the invention. It has proven particularly advantageous if the directional valve is configured as a slide valve with two switching positions, and the slide of the directional valve is arranged parallel to the crankshaft longitudinal axis or to the rotational axis of the connecting rod eyes. It is then possible namely to move the slide from the one position into the other position by way of an actuating element which is arranged fixedly in the crankcase. This can be achieved, for example, by way of a fork-shaped actuating element which can be displaced in the direction of the longitudinal axis of the crankshaft. During every revolution of the crankshaft, the valve member dips into the fork of the actuating element, which fork is arranged displaceably on the crankcase, and is held in the desired position as a result or is moved into a new position.

In order that the valve member is not in permanent contact with the adjusting element after a change in the position has been carried out, a spring-loaded ball is arranged in the directional valve, which spring-loaded ball engages into a correspondingly positioned depression of the valve member when the latter assumes its first and/or its second switching position.

Further advantages and advantageous refinements of the invention can be gathered from the following drawings and the description.

BRIEF DESCRIPTION OF THE DRAWINGS

Various views of one exemplary embodiment of a VCR conrod according to the invention, in which.

DETAILED DESCRIPTION OF THE INVENTION

FIGS. 1 to 12 show one and the same exemplary embodiment, with the result that it goes without saying that the designations in various figures in each case have the same meaning, and swapping is carried out between the various figures in order to explain the invention.

Figure 1:
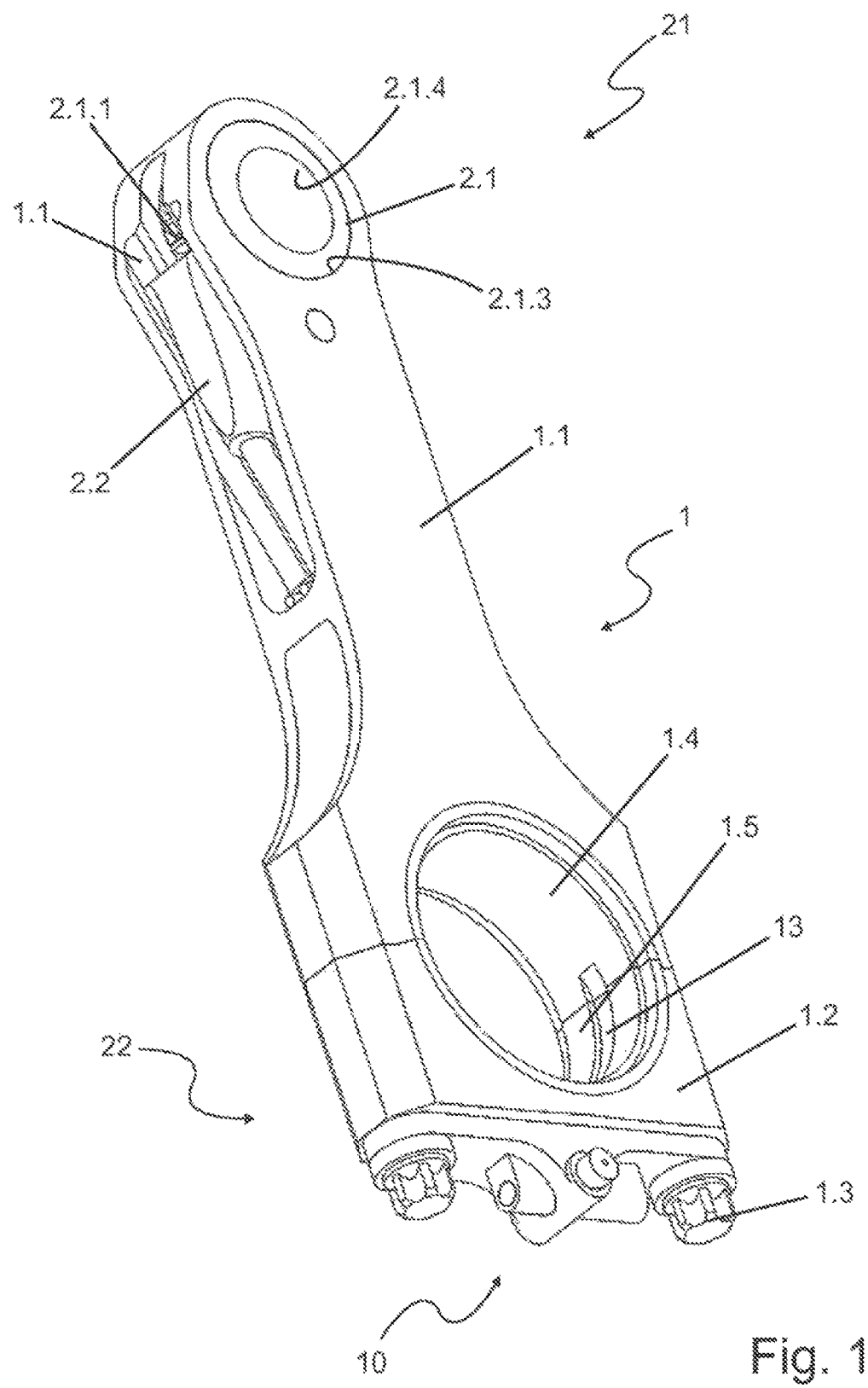
FIG. 1 shows a perspective illustration of the conrod with a directional valve.

FIG. 1 shows a perspective view of a connecting rod 1 according to the invention, the small connecting rod eye 21 being arranged at the top in FIG. 1 and the large connecting rod eye 22 being arranged at the bottom in FIG. 1. Both the small connecting rod eye 21 and the large connecting rod eye 22 are part of a connecting rod main body 1.1. An eccentric 2.1 is arranged in the small connecting rod eye 21, which eccentric 2.1 has a cylindrical external diameter 2.1.3 and a bearing bore 2.1.4 which is arranged eccentrically with respect to the external diameter 2.1.3. The gudgeon pin (not shown) of a piston of the internal combustion engine is mounted in a manner known per se in the bearing bore 2.1.4.

If the eccentric 2.1 is then rotated relative to the connecting rod main body 1.1, the spacing of the bearing bore 2.1.4 from the large connecting rod eye 22 changes. As a consequence thereof, the effective length of the connecting rod 1 and the compression ratio of the internal combustion engine also change.

At the lower end (in FIG. 1) of the connecting rod 1, a connecting rod bearing cap 1.2 and a directional valve 10 are screwed to the connecting rod main body 1.1 with the aid of the connecting rod screws 1.3.

In the exemplary embodiment which is shown, the bearing shell of the large connecting rod eye 22 is split in two; it comprises an upper connecting rod bearing shell 1.4 and a lower connecting rod bearing shell 1.5.

A supply groove 13 is configured in the lower connecting rod bearing shell 1.5. An inlet of the directional valve 10 is supplied with oil via said supply groove 13. The oil is conveyed by the oil pump of the internal combustion engine through the crankshaft (not shown) to the large connecting rod eye 22.

Figure 7:
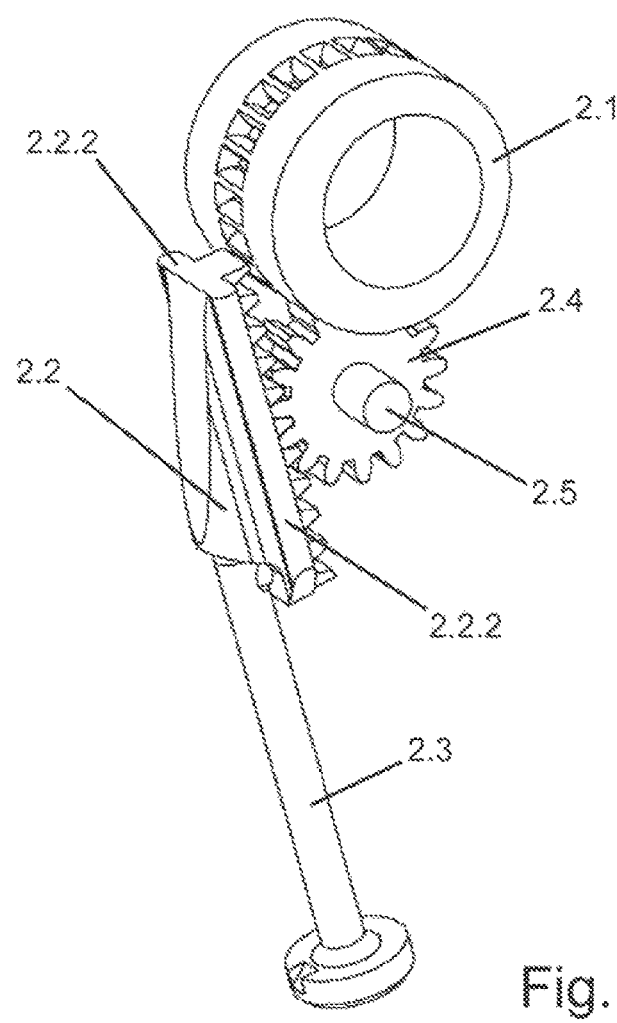
FIG. 7 shows a perspective illustration of the essential components of the supporting system.

A part of an external toothing system 2.1.1 on the eccentric 2.1 can be seen in the upper part of FIG. 1. It can be seen, furthermore, that a profiled groove 1.1.1 is configured in the connecting rod main body 1.1, in which profiled groove 1.1.1 a rack 2.2 is guided displaceably by way of its guide faces 2.2.2. The guide faces cannot be seen in FIG. 1. In FIG. 7, for example, the guide faces 2.2.2 are shown cut free and are clearly visible. The linear guide which is formed from guide faces 2.2.2 and the groove 1.1.1 can be seen very clearly in FIG. 6.

Figures 2, 3:
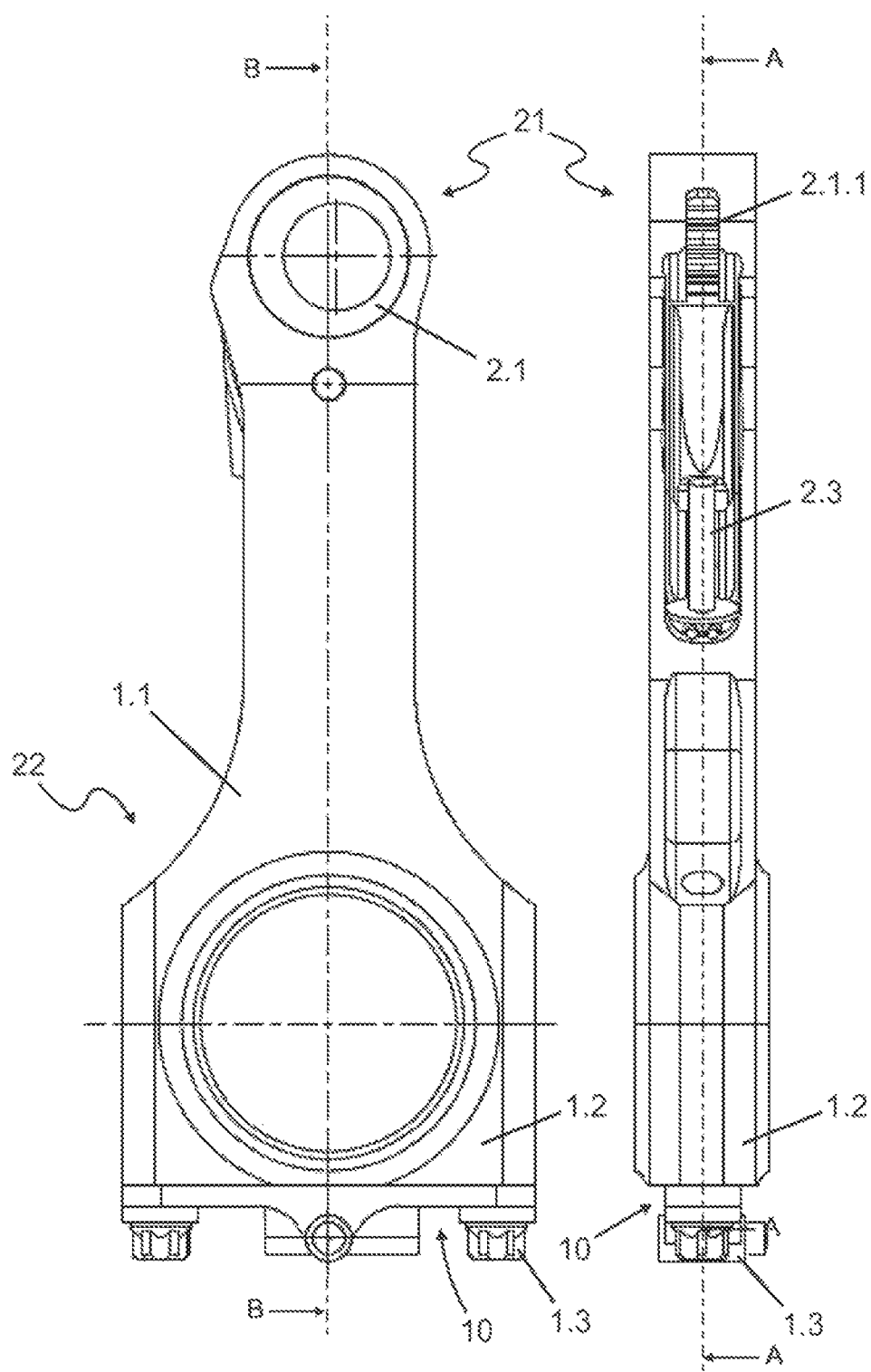
FIG. 2 shows a front view of the conrod.
FIG. 3 shows a side view of the conrod from FIG. 1.
Figure 4:
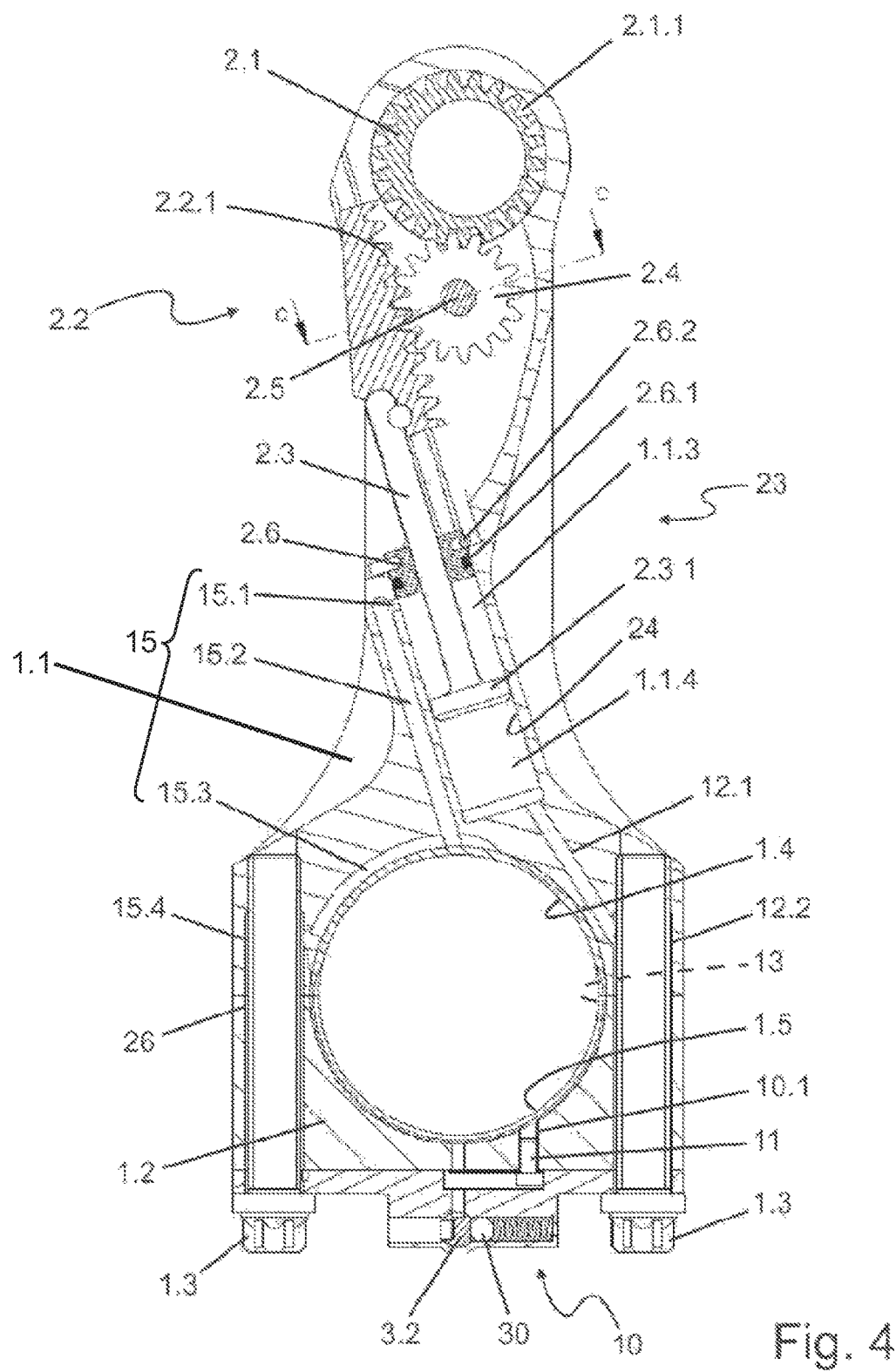
FIG. 4 shows a sectional view of the conrod along the sectional line A-A in FIG. 4.
Figure 5:
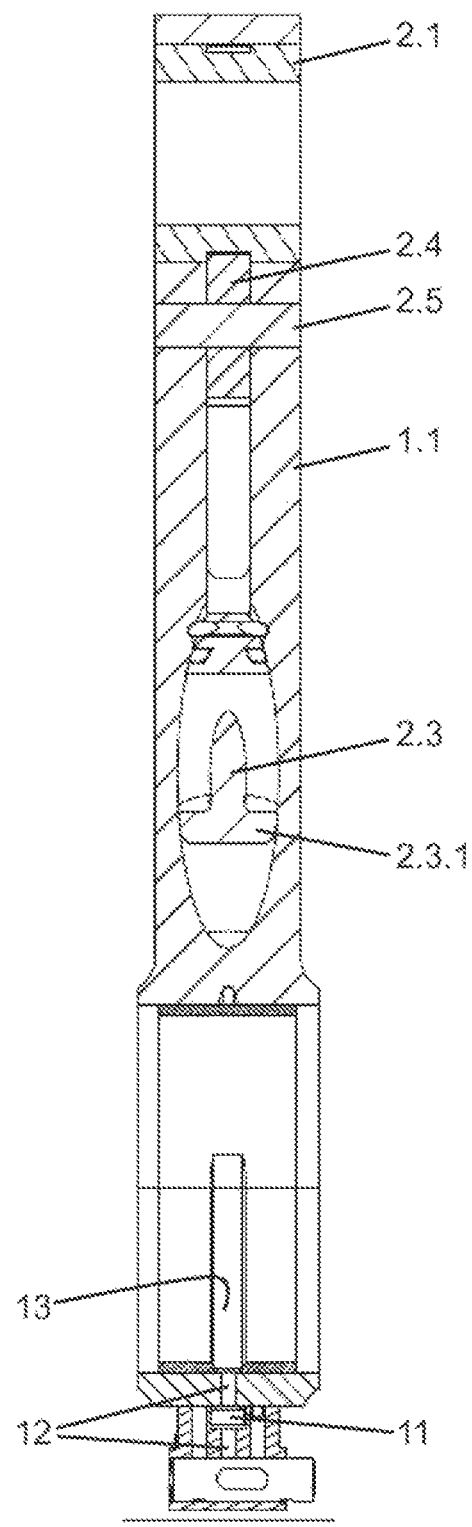
FIG. 5 shows a sectional view of the conrod along the sectional line B-B in FIG. 2.
Figure 6:
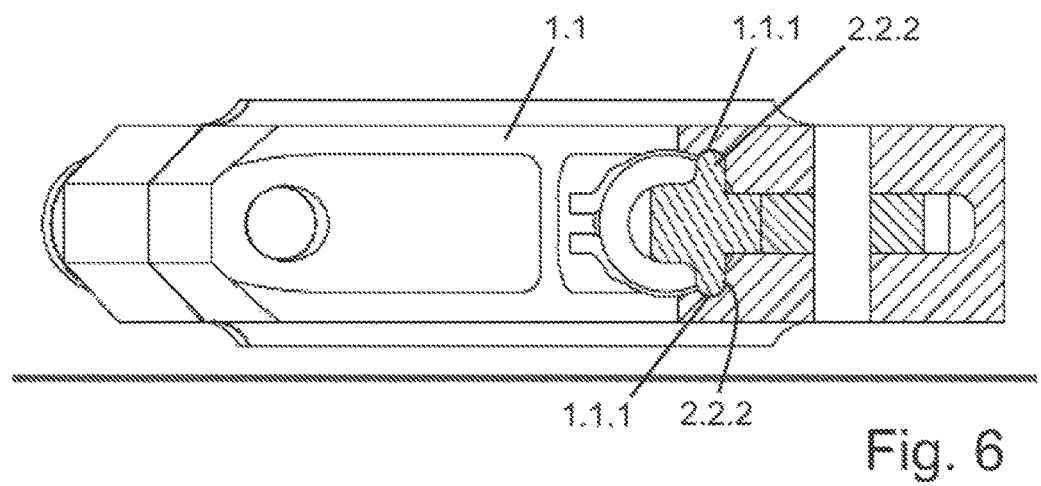
FIG. 6 shows a sectional view of the conrod along the sectional line C-C in FIG. 1.

As arises from FIG. 4 which shows a longitudinal section through the connecting rod 1 according to the invention along the line A-A in FIG. 3, the rack 2.2 is coupled to a piston rod 2.3 which in turn bears a (supporting) piston 2.3.1. The (supporting) piston 2.3.1 serves to support the eccentric 2.1 via the rack 2.2 with teeth 2.2.1 and the gearwheel 2.4 in a defined position which is predetermined by the controller of the internal combustion engine. The piston 2.3.1 is therefore partially also called a supporting piston. It does not have to perform work, as is the function in conventional hydraulic cylinders, and to actively rotate the rack and, as a consequence, also the eccentric 2.1 via the piston rod 2.3. The energy which is required to rotate the eccentric 2.1 is provided at least partially via the mass forces which act on the eccentric 2.1 during operation of the internal combustion engine.

The cylinder according to the invention has two functions: firstly, supporting of the eccentric moments which come from the force at the gudgeon pin; secondly, the pressure difference at the double acting piston is also to be utilized, in order to "push" the eccentric out of its end positions because the eccentric moment is low in the end positions. In the extreme case, the eccentric moment is even zero. This is the case as a rule when a rotational angle of 180° is realized.

The piston 2.3.1 and the piston rod 2.3 are part of a double acting cylinder 23, the cylinder bore 24 of which is drilled directly into the main body 1.3 of the connecting rod 1 and is subsequently precision machined.

The piston bushing 2.6 is sealed with respect to the cylinder bore 24 by means of an O-ring 2.6.1 and is fixed in the cylinder bore 24 or the main body 1.1 with the aid of a wire ring or another securing element 2.6.2.

Like every double acting cylinder, the supporting spaces 1.1.3 and 1.1.4 have in each case one connector to the oil supply.

In the case of the upper supporting space 1.1.3, the oil supply takes place via a first duct 15 which is formed from a plurality of sections, in the upper part from a transverse bore 15.1, a bore 15.2 parallel to the cylinder 23, a circular segment-shaped cutout 15.3 and finally an annular gap 15.4 between the left-hand (in FIG. 4) connecting rod screw 1.3 and the bore 26 of the connecting rod bearing cap 1.2 or the connecting rod main body 1.1.

In a similar way, the second duct 12 which connects the lower supporting space 1.1.4 to the directional valve 10 hydraulically consists of a bore section 12.1 and an annular gap 12.2 between the right-hand (in FIG. 4) connecting rod screw 1.3 and the connecting rod bearing cap 1.2 and the connecting rod main body 1.1.1. The way in which the ducts 15 and 12 are routed is determined predominantly by manufacturing aspects. The routing of the ducts 15 and 12 within the connecting rod main body 1.1 is of minor significance for the function of the invention.

In the exemplary embodiment which is shown, both ducts 12 and 15 open into the valve 10 at the bottom on the underside of the connecting rod bearing cap 1.2.

As has already been explained, the lubricating oil is present at an inlet of the directional valve 10 at the pressure which is provided by the oil supply of the internal combustion engine.

The directional valve 10 can be switched to and fro between two switching positions when the engine is running, with the result that either oil is guided into the lower supporting chamber 1.1.4 or oil is conducted into the upper supporting chamber 1.1.3.

The hydraulic force which results from the oil pressure in one of the two supporting chambers 1.1.3 and 1.1.4 is sufficient to move the piston into one of the two end positions and to hold it there, with the result that the oil which is situated in the relevant supporting chamber serves as a stop for the supporting piston 2.3.1 and therefore a rotation of the eccentric 2.1 is prevented. The maintaining of the eccentric position is made possible by way of the check valve in the feed line. However, the "pushing" from the end positions which is triggered and/or assisted by the oil pressure in the relevant supporting chamber and the assistance of the moments in the respective direction which result from the gudgeon pin forces are important. The eccentric 2.1 itself has no end stops. The hydraulic piston acts as a travel limiting means. Said hydraulic piston can rest at the bottom on the inside or can bear against the piston bushing at the top.

Figure 8:
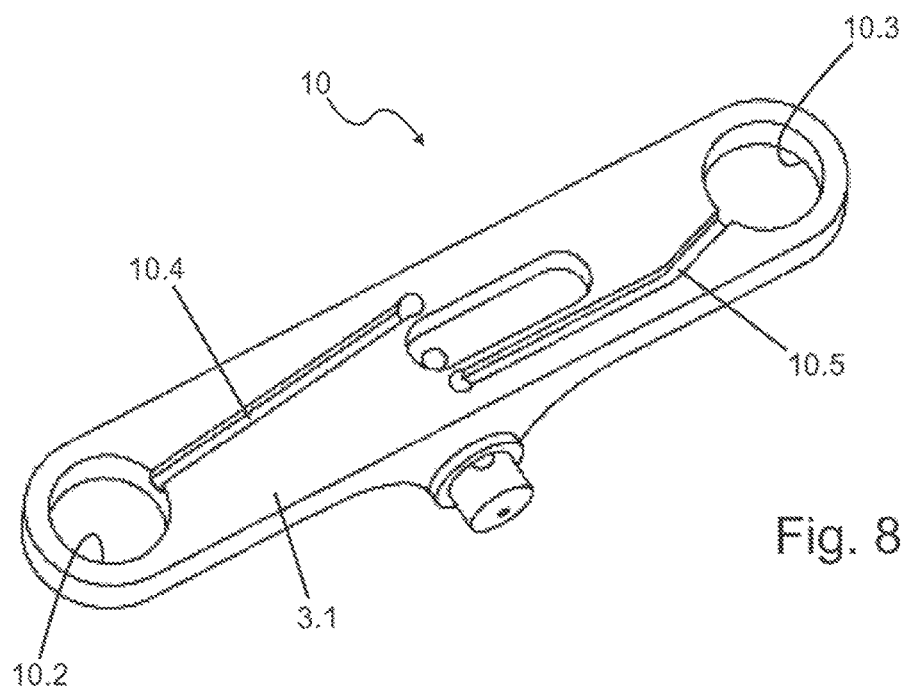
FIG. 8 shows a perspective illustration of the directional valve.

The construction of the directional valve 10 which is shown by way of example will be described in somewhat more detail using FIGS. 8 to 10.

There are two through bores 10.2 and 10.3 in a main body 3.1 of the directional valve 10. The connecting rod screws 1.3 protrude through the bores 10.2 and 10.3 when the directional valve 10 is screwed onto the connecting rod bearing cap 1.2 from below. Here, the diameter of the bores 10.2 and 10.3 is somewhat greater than the diameter of the shank of the connecting rod screws 1.3, with the result that an annular duct is also formed there, which annular duct extends the ducts 15 and 12 in the connecting rod main body 1.1.1.

Two grooves 10.4 and 10.5 are configured on the upper (in FIG. 8) surface/top side of the main body 3.1, one of the grooves 10.4 and 10.5 ending in a bore 10.2 and 10.3, respectively. By way of said grooves 10.4 and 10.5, the bores 10.2 and 10.3 are connected to two outlets of the directional valve 10.

A third groove 10.6 is machined approximately in the center of the valve body 10.2, which third groove 10.6 is connected hydraulically to the supply groove 13 in the assembled state of the directional valve 10. The groove 10.6 provides the inlet of the directional valve 10.

Figure 9:
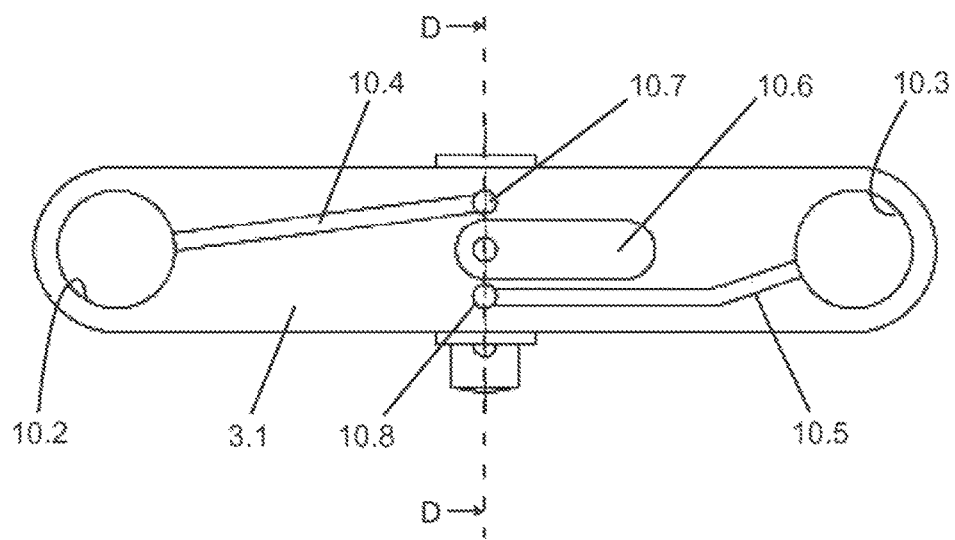
FIG. 9 shows a plan view of the directional valve.
Figure 10:
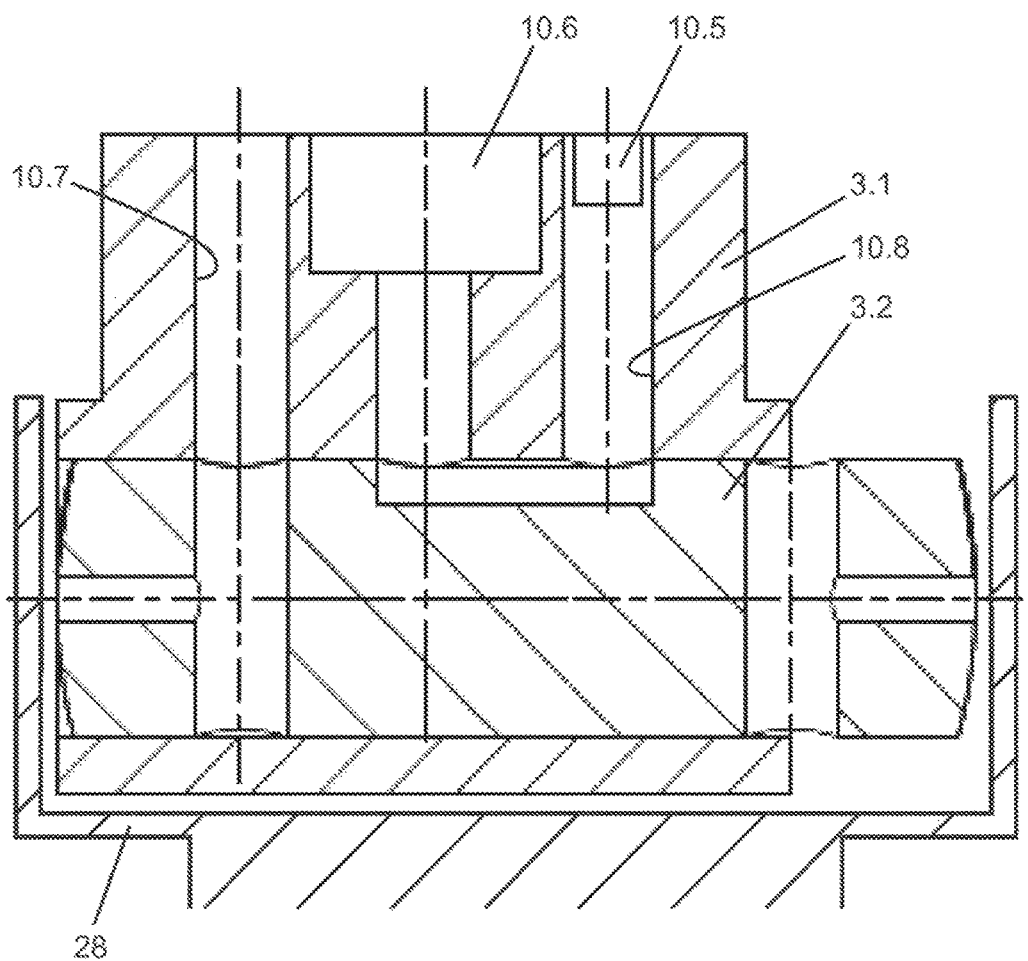
FIG. 10 shows a sectional view along the sectional line D-D in FIG. 9.

FIG. 10 shows the valve body 3.1 along the line D from FIG. 9.

The slide 3.2 can be seen clearly in FIG. 10, which slide 3.2 connects the groove 10.6 (inlet of the directional valve 10) to the groove 10.5 in the switching position which is shown. The inlet of the directional valve 10 is therefore connected hydraulically to the lower supporting space 1.1.4 via the second duct 12 with the sections 12.2 and 12.1.

The groove 10.4 is not visible in the left-hand part of FIG. 1 because it lies "in front of" the sectional plane. It can be seen clearly, however, that the bore 10.7 which is connected to the groove 10.4 is connected to the surroundings in the switching position of the slide 3.2 which is shown. This means that the upper supporting space 1.1.3 is pressureless.

If the slide 3.2 in FIG. 10 is then displaced to the left relative to the valve housing 3.1, the slide 3.2 connects the inlet of the directional valve 10 (=the groove 10.6) to the outlet 10.7 which is in turn connected hydraulically to the first duct 15 and therefore fills the upper supporting space 1.1.3 with oil.

At the same time, the lower supporting space 1.1.4 is switched to pressureless or is connected hydraulically to the surroundings, that is to say the interior of the crankcase.

The ends of the slide 3.2 are of crowned configuration. In order that the slide 3.2 can be moved while the engine is running, there is an actuating element in the crankcase, which actuating element can be configured, for example, as a fork 28, the slide 3.2 being received between the two prongs of the fork 28. FIG. 10 shows a fork 28 of this type diagrammatically. If the fork 28 is then moved to the left when the internal combustion engine is running, the right-hand crowned end of the directional valve 10 runs on the right-hand prongs of the fork 28 and is moved to the left by the latter. In the reverse direction, the actuating movement takes place from the second switching position (not shown) into the switching position which is shown in FIG. 10 if the fork 28 is displaced from the left-hand end position (not shown) into the right-hand end position.

In order that the slide 3.2 maintains its switching position, a spring-loaded ball 30 is provided which latches into a corresponding depression of the slide 3.2 when the latter has reached one of its switching positions (see FIG. 4).

FIG. 7 shows the components which serve for the supporting function. In the refinement which is shown, a toothing system 2.1.1 is machined centrally onto the external diameter 2.1.3 of the eccentric 2.1. Said toothing system meshes with the gearwheel 2.4. The gearwheel 2.4 is mounted rotatably and with as little friction as possible in the connecting rod main body 1.1 via an axle 2.5. The rack 2.2 meshes with the gearwheel 2.4. In this way, there is a kinematic coupling between the rotation of the eccentric 2.1 and the lifting movement of the rack 2.2. The rack 2.2 is attached rigidly to the piston rod 2.3 in the stroke direction, as a result of which the stroke movements of the rack 2.2 and the piston rod are identical. The rack 2.2 is guided via the guide faces 2.2.2 in the profiled groove 1.1.1 in the connecting rod main body 1.1. By way of this type of linear guide, the radial force which is induced at the rack 2.2 is supported in the connecting rod main body 1.1.

FIG. 4 shows the conrod in the eccentric center position. The rack 2.2 is situated at half its adjustment travel.

Figure 11:
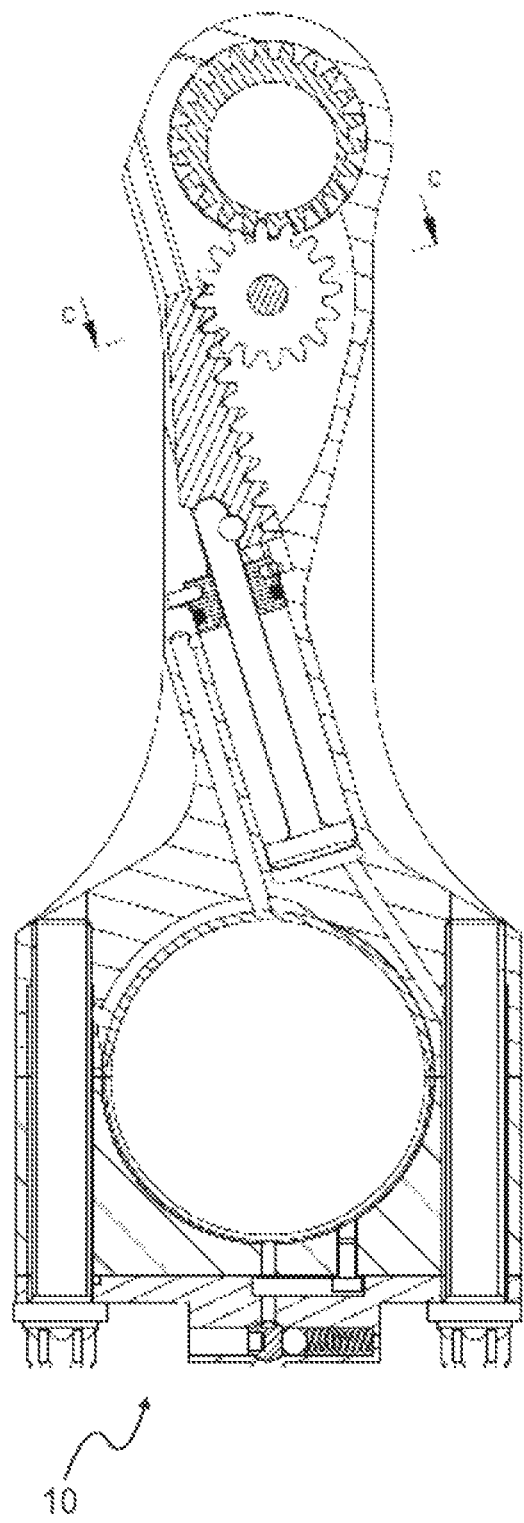
FIG. 11 shows a sectional view of the conrod in an eccentric position close to the minimum compression.

FIG. 11 shows the conrod in a position close to the position "minimum compression".

Figure 12:
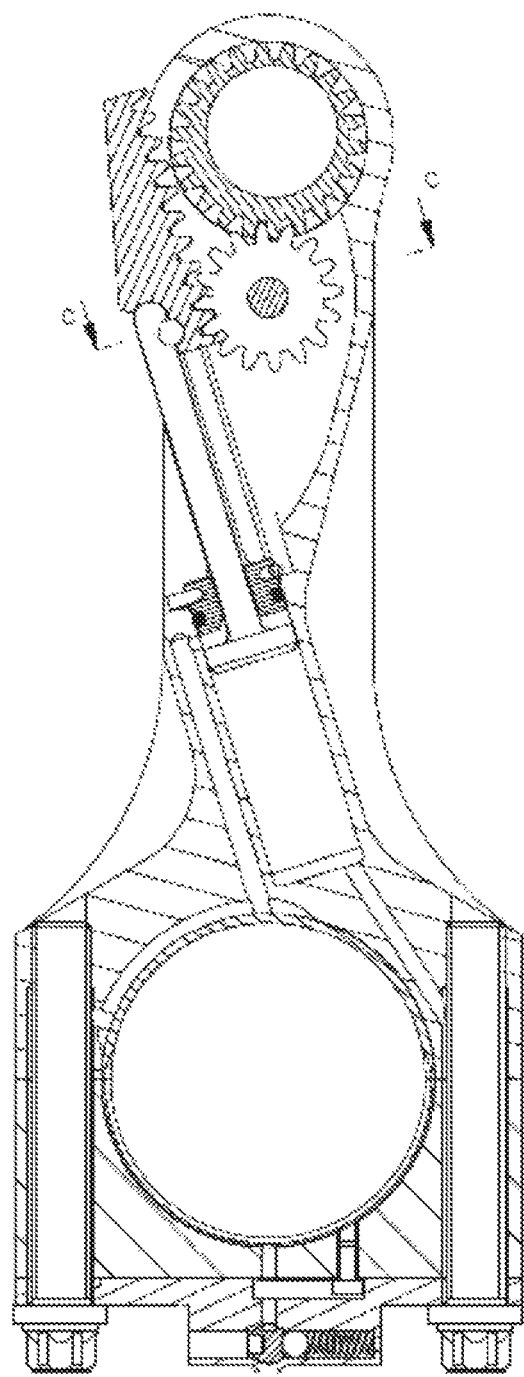
FIG. 12 shows a sectional view of the conrod in an eccentric position close to the maximum compression.

FIG. 12 shows the conrod in a position close to the position "maximum compression". The force which acts on the rack 2.2 in the movement direction acts on the piston rod 2.3. The piston 2.3.1 separates the upper supporting chamber 1.1.3 from the lower supporting chamber 1.1.4. The two supporting chambers are part of a double acting cylinder 23. The upper supporting chamber 1.1.3 is sealed via the piston bushing 2.6 with respect to the surroundings of the conrod. Here, the piston bushing 2.6 is sealed, for example, via an O-ring 2.6.1 with respect to the connecting rod main body 1.1 and is fixed by way of a securing ring 2.6.2.

As has already been explained, the two supporting chambers 1.1.3 and 1.1.4 can be connected hydraulically to the surroundings of the conrod 1, that is to say the crankcase of the engine. As an alternative, the fluidic connection can be established with the connecting rod bearing of the large connecting rod eye 22. A connection according to FIG. 10 is provided in the refinement which is shown here.

Here, for example, a 4/2-way valve 10 is used. The directional valve has two switching positions and four connectors. The connectors are: tank (connection to the crankcase axially in the slide), pump (supply groove), working connector 1 (connection to the supporting chamber 1), working connector 2 (connection to the supporting chamber 2). Although the exemplary embodiment has five connectors, the two outlets into the crankcase can be counted as one connector, since they after all open into the same space. This is done merely for reasons of installation space. A bore 10.1 establishes a connection between a supply groove 13 and the directional valve 10. A check valve 11 (see FIG. 4) is situated in the bore 10.1, which check valve 11 prevents a return flow of oil into the supply groove 13. The check valve 11 serves, above all, to prevent a reverse rotation of the eccentric under the influence of large moments. Apart from pronounced low load and low rotational speed points, the moment on account of the supply oil pressure is considerably lower than the moment which is caused by way of the gudgeon pin forces. In a first switching position of the 4/2-way valve, the lower supporting chamber 1.1.4 is loaded with oil pressure. Here, the upper chamber 1.1.3 is ventilated via the first duct 15, that is to say is connected to the crankcase.

Since the oil pressure which prevails in the supply groove is always greater than the pressure which prevails in the crankcase, the resulting fluidic force acts in the direction of the rack 2.2. In the other switching position of the directional valve, the resulting fluidic force acts in the opposite direction. However, the magnitude of said fluidic force at the same oil pressure in the supply groove 13 is lower than in the first valve switching position if the active piston faces, as configured in FIG. 13, are of different size.

Said fluidic force brings about a corresponding first torque on the eccentric via the mechanism which is shown in FIG. 7. A second torque is produced as a consequence of the forces which act on the gudgeon pin, which second torque is superimposed with the first torque. Depending on the instantaneous oil pressure in the supply groove and the instantaneous force on the gudgeon pin, a corresponding resulting torque is produced on the eccentric. The resulting torque on the eccentric causes the eccentric 2.1 to rotate into its end positions and, as a consequence thereof, the VCR to assume two different values.

Advantages of the Invention

Slight increase in the connecting rod mass, in particular of the oscillating mass. An eccentric 2.1 can be rotated by up to 180° by way of the use of a rack. As a result, a lower eccentricity is required to produce a defined variation range of the connecting rod length.

The eccentric moment to be supported is also reduced as a result. As a consequence thereof, the supporting mechanism can be of weaker dimensions, which is ultimately also reflected in a lower component mass. If the possible eccentric rotational range is utilized completely, that is to say a rotational angle of 180° in the extreme case, a further advantage can also be realized: in theory, no more eccentric moment at all has to be supported in the eccentric end positions, since the gudgeon pin then lies precisely on the connecting line between the large and the small connecting rod eye 22, 21 (see FIGS. 11 and 12). The gudgeon pin force is therefore introduced into the connecting rod main body 1.1 on a direct path, with the result that the conrod has a similarly great tensile and compressive stiffness as a conventional conrod.

As a consequence of the lower eccentricity, the external diameter 2.1.3 of the eccentric 2.1 can also be of small configuration. This in turn has the consequence that the connecting rod head also has smaller dimensions. It is due to said effects together that there is correspondingly less mass in the vicinity of the small connecting rod eye 21, which has a favorable effect on the oscillating mass.

The rack 2.2 and the gearwheel 2.4 are situated below the small connecting rod eye 21 and are therefore incorporated into the oscillating mass to a less pronounced extent.

The installation space requirement, in particular in the internal region of the piston, is very low. In the solution which is proposed here, the rack 2.2 protrudes only a little beyond the silhouette of the connecting rod main body 1.1, as can be seen in FIG. 12.

In FIG. 12, the eccentric 2.1 is situated in the position "high compression". Here, the rack 2.2 is extended to its maximum. This favorable circumstance was made possible by another gearwheel 2.4 having been introduced between the eccentric 2.1 and the rack 2.2. In this way, the rack engagement point is at a lower location than in the case of a direct engagement, that is to say if the rack 2.2 meshed directly with the eccentric. Direct meshing is possible, but is not to be recommended as a general rule on account of the installation space requirement. If, in contrast, there are no installation space restrictions in this region, for example in the case of a piston with a comparatively great compression height, direct meshing (that is to say, without an intermediate gear) would be advantageous because the number of parts could be reduced as a result.

The low installation space requirement of the present solution is very important with regard to the universal usability of the VCR conrod for different engines, since there is a similarly great design freedom in this case as in the case of a conventional conrod.

On account of the relatively simple construction and because only a few functional faces with low tolerances have to be manufactured, the VCR conrod according to the invention can be manufactured inexpensively. The machining operations on the connecting rod main body which are to be added in comparison with a conventional conrod are substantially the following.

The pocket for receiving the gearwheel 2.4 can be manufactured with a comparatively large slide milling cutter, which is very favorable with regard to machining time and tool wear.

The parts of the supporting mechanism, namely the rack 2.2 and the gearwheel 2.4, can be manufactured by way of inexpensive sintering technology.

The groove 1.1.1 in the connecting rod main body 1.1 can be manufactured easily by means of an end mill which runs perpendicularly with respect thereto.

Reduction of the undesired effect of the increase in the adjusting times toward low engine rotational speeds.

This negative effect manifests itself to a less pronounced extent in this construction. Thanks to the hydraulic connection which is shown in FIG. 10, in each case one side of the double acting supporting cylinder is ventilated, that is to say is brought into fluidic connection with the crankcase. As a result, the oil pressure which acts on the respectively other piston side causes a piston force which acts on the eccentric 2.1 via the rack 2.2. This force is active even if only low centrifugal forces act on the power unit at low engine rotational speeds. The undesired increase in the adjusting time toward "high compression" at low engine rotational speeds therefore manifests itself more weakly.

In the present invention, an intake of air into the supporting chambers 1.1.3 and 1.1.4 is not critical, since the eccentric 2.1 is theoretically moment-free in the end position, and therefore an inclusion of air in the hydraulic support is without further consequences. This insensitivity to the inclusion of air has the great advantage that the oil supply may be interrupted, and that a higher transfer speed of the piston 2.3.1 can be permitted.

It is therefore also possible that the supply groove 13 in the connecting rod bearing shell has to extend only over an angle of approximately 180°. As a result, the connecting rod bearing is impaired to a correspondingly lesser extent in terms of its load-bearing behavior. Secondly, the adjusting speed can be increased as a consequence of the higher permissible transfer speed.

The invention claimed is:

1. A connecting rod for an internal combustion engine comprising a first large connecting rod eye, a second connecting rod eye, an eccentric member with a bearing bore which is arranged eccentrically with respect to the external diameter of the eccentric member for a gudgeon pin being configured in the second connecting rod eye, and means for rotating the eccentric member relative to the connecting rod being provided, wherein the means for rotating the eccentric member having a rack and pinion drive and a double acting hydraulic cylinder which is coupled to the rack and pinion drive, the rack and pinion drive and the hydraulic cylinder being an integral part of the connecting rod.

2. The connecting rod as claimed in claim 1, wherein the eccentric member has a toothing system which is concentric with respect to an external diameter of the eccentric member and meshes directly or indirectly via a gearwheel with the rack.

3. The connecting rod as claimed in claim 1, wherein at least one guide face that interacts with a complementary groove in the connecting rod is configured on the rack.

4. The connecting rod as claimed in claim 1, wherein the hydraulic cylinder comprises a piston rod and a piston, and wherein the piston rod is coupled to the rack.

5. The connecting rod as claimed in claim 1, wherein a cylinder bore of the hydraulic cylinder is arranged in the connecting rod.

6. The connecting rod as claimed in claim 1, wherein the piston divides the cylinder bore into an upper supporting chamber and a lower supporting chamber, wherein the upper supporting chamber is sealed at one end by way of a piston bushing, and wherein the piston rod is guided sealingly through the piston bushing.

7. The connecting rod as claimed in claim 6, wherein a first duct for supplying the upper supporting chamber and a second duct for supplying the lower supporting chamber are configured in the connecting rod.

8. The connecting rod as claimed in claim 7, wherein the first duct and the second duct are connected hydraulically to a lubricant supply of the large connecting rod eye.

9. The connecting rod as claimed in claim 8, wherein a supply groove is configured in the large connecting rod eye.

10. The connecting rod as claimed in claim 9, wherein a directional valve is arranged between the lubricant supply of the large connecting rod eye and the ducts.

11. The connecting rod as claimed in claim 10, wherein the directional valve has an inlet and at least two outlets, and wherein the at least two outlets are each connected hydraulically to one of the ducts.

12. The connecting rod as claimed in claim 10, wherein the directional valve is a slide valve and/or a 4/2-way valve.

* * * * *